Jan. 10, 1967  G. C. HAACKE  3,297,403
METHOD FOR THE PREPARATION OF INTERMETALLIC COMPOUNDS
Filed March 26, 1964
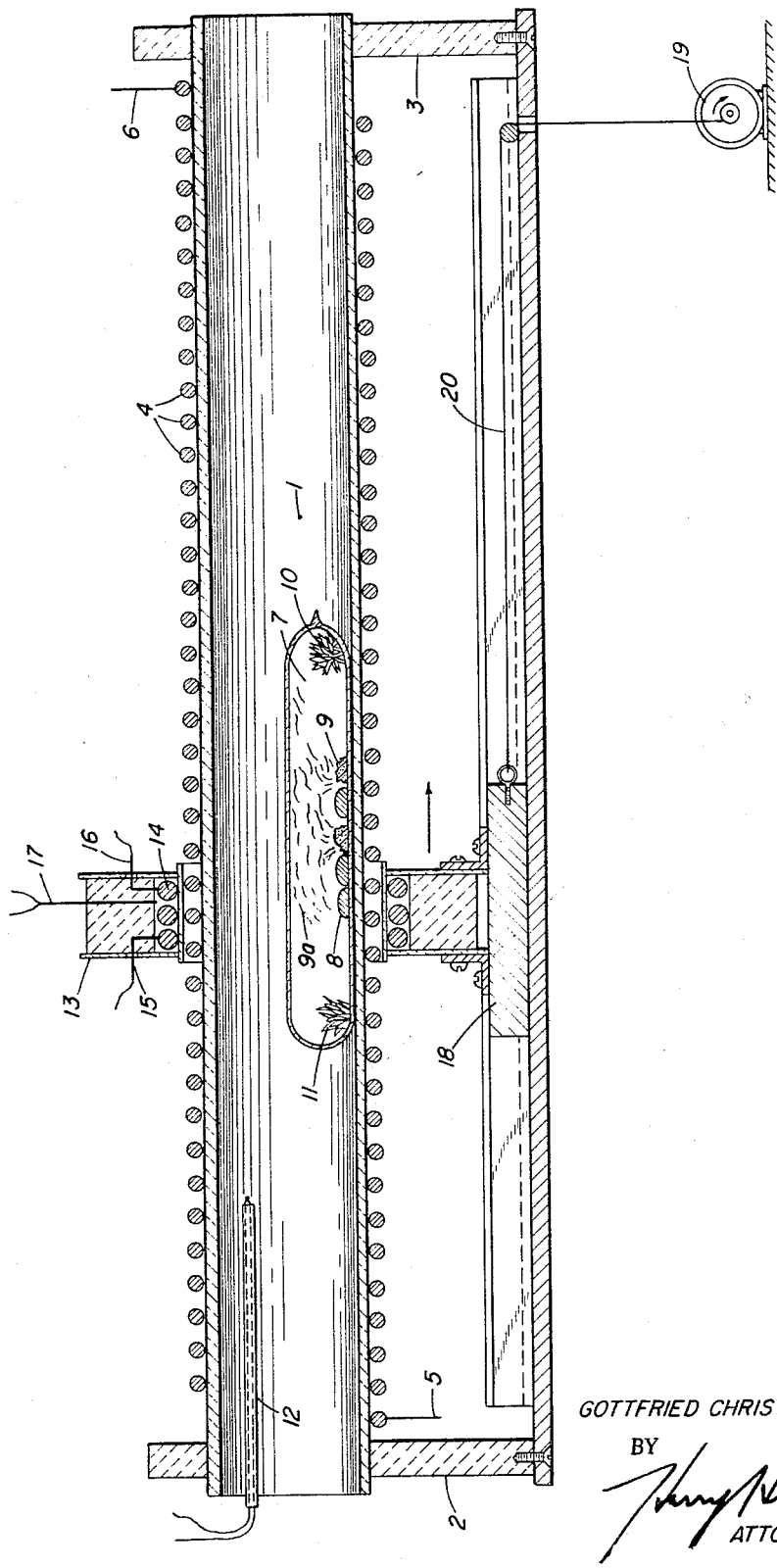
INVENTOR.
GOTTFRIED CHRISTIAN HAACKE
BY
ATTORNEY United States Patent Office 3,297,403
Patented Jan. 10, 1967

3,297,403
METHOD FOR THE PREPARATION OF INTERMETALLIC COMPOUNDS
Gottfried Christian Haacke, Stamford, Conn., assignor to American Cyanamid Company, Stamford, Conn., a corporation of Maine
Filed Mar. 26, 1964, Ser. No. 354,891
4 Claims. (Cl. 23—204)

The present invention relates to a novel process for preparing intermetallic compounds ordinarily employed as semiconductors. More particularly, the invention relates to the preparation of intermetallic compounds which decompose at or near their melting points. Still more particularly, the invention is concerned with the preparation of semiconductors of high purity, employing temperatures well below their melting points while utilizing controlled temperature differential conditions herein defined with particularity.

The semiconductors or intermetallic compounds prepared herein are primarily binary compounds which include the Group II–V, Group III–V and Group II–VI compounds of the Periodic Table. These are, for instance, cadmium phosphide, cadmium arsenide, cadmium selenide, gallium arsenide, indium phosphide and gallium phosphide. Although the invention will be described with reference to binary compounds, ternary compounds including a plurality of cations bonded to an anion, such as for instance, cadmium zinc arsenide, may also be prepared in accordance with the method of the invention.

Intermetallic compounds can be formed by several well known methods. In a typical procedure, the elements comprising the intermetallic compound are vaporized in hot zones of different temperatures according to their vapor pressures while passing a stream of an inert gas therethrough in order to cause reaction to occur. Resultant formed compound is then condensed by cooling. Unfortunately, this method is not completely satisfactory for the reason that impurities or contaminants, such as oxygen, are usually introduced by the inert flowing gas, rendering resultant compounds sufficiently impure to meet the high standards for semiconductors. Further, substantial difficulty is experienced when attempting to accurately adjust the vapor pressures of the element components with the precision necessary to obtain the desired compound absent admixture therewith of one or more of the element components.

In a second known method, the elements which will comprise the desired intermetallic compound are initially introduced into an ampoule in powder form, then evacuating and sealing the ampoule, and finally heating the powdery mixture at temperatures well below the melting point of the compound. Although the reaction is extremely long in duration, a heterogeneous rather than homogeneous product results. In addition, many elements oxidize rather easily as powders. However, these powders cannot be obtained readily in sufficiently pure form to meet the high standards of purity required for semiconductor utility.

In a third method, elements, such as phosphorus or sulfur having ordinarily high vapor pressures, in the molten state are prepared in a closed glass container. The reaction is usually terminated prematurely due to the highly corrosive nature of the reactants and fear of explosion. This can be avoided only where special, expensive equipment capable of withstanding corrosivity and elevated temperatures and pressures is employed, thereby rendering such procedure commercially unattractive.

It is, therefore, a principal object of the invention to overcome the difficulties of the prior procedures. It is a further object to provide an economical and straightforward process for preparing substantially pure intermetallic compounds utilizing inexpensive equipment without danger of explosion and corrosivity. Other objects and advantages will become apparent from a consideration of the following description.

To this end, a simple and straightforward method is provided. In general, elements which ultimately will comprise the intermetallic compound are selectively melted in a sealed, elongated ampoule from which all air had been eliminated and is maintained at approximately $1 \times 10^{-5}$ mm. Hg pressure either in the absence or presence of a inert gas, such as nitrogen. It has been found that vapors of the Group V or Group VI anions, such as phosphorus, arsenic or selenium, readily react with the molten Group II or Group III cations, thereby blanketing the molten cations with a layer of formed compound. Apparently, reaction is deterred from proceeding. There is then provided a movable heating zone or mantle. The heating zone or mantle is placed over and around a portion of the elongated ampoule to cause the formed compound, which blankets the molten cation, to vaporize therefrom and to condense ultimately in the cooler portion of the ampoule. The movable heating zone or mantle is slowly moved uniformly and continuously to permit complete reaction between the molten cations and the vaporized anions to occur. In this manner, complete reaction takes place at an over-all temperature which is below the decomposition temperature of the resultant compound.

The invention will be further described with reference to the drawing which is illustrative of the formation of cadmium phosphide, a preferred species and embodiment of the invention, and should not be taken as being limitative.

In the drawing, there is represented in cross section an elongated glass tube at 1 supported by frames 2 and 3 and surrounded by an internally wrapped-about resistance wire at 4. The latter brings the temperature of the elongated glass tube to constant temperature within about 500° C.–550° C. Leads 5 and 6 are suitably attached to a power source (not shown). Prior to heating of the glass tube, however, there is inserted therein an evacuated ampoule at 7 containing the elements to be combined, as for instance, cadmium at 8 and red phosphorus at 9 in stoichiometric amounts. As depicted, the cadmium is in the molten state, whereas the red phosphorus exists both as a solid 9 and as a vapor at 9a. At the cooler portion of the ampoule, the combined solid product, cadmium phosphide, is depicted at 10 and 11.

The evacuated ampoule is stationary and is maintained at a constant temperature as measured by thermocouple 12. A heating mantle or jacket 13 provided with (a) its resistance wire 14, (b) leads 15 and 16 to a power source (not shown) and (c) thermocouple 17, is suitably mounted on a movable platform 18. The latter is positioned so that it locally heats the contents of the evacuated ampoule 7. The heating mantle or jacket 13 is attached to a motor 19 through a wire 20. The platform is then pulled at a constant rate, usually from about 10 mm. to about 50 mm. per day, until the entire length of the ampoule 7 has been exposed to the heating mantle 13.

Within the exposure period the molten cadmium has readily reacted with the phosphorus vapor at about 500° C. However, the surfaces of the molten cadmium are soon blanketed by a protective coating of formed cadmium phosphide. When the movable heating jacket or mantle, which is maintained at a temperature usually about 700° C., is positioned locally over a small portion of the ampoule, the so-formed cadmium phosphide vaporizes from the surface of the molten cadmium. The molten cadmium is thereby exposed to further reaction with vaporous phosphorus. Condensation of compound vapors in the cooler portion of the evacuated ampoule then occurs, forming cadmium phosphide. Thus, reaction to form cadmium phosphide and evaporation of the latter continue until all the molten cadmium is consumed within the local heating zone. Sufficient molten cadmium is provided in the local heating zone to deplete its supply within the designated time in which the heating mantle is specifically maintained at about 700° C.

Advantageously, polycrystals of cadmium arsenide, cadmium sulfide and equivalents thereof can also be prepared by the process of the invention. The use of excessive temperatures sufficiently high to cause the elements of Group V or Group VI to become molten is thus avoided. Further, explosions in ordinary glass equipment are prevented and commercialization of the process on a large scale is presently achievable.

I claim:
1. In a process for preparing a crystallized intermetallic compound in the vapor phase at a temperature below its decomposition temperature by bringing into chemical reaction stoichiometric amounts of (a) a cationic element selected from the group consisting of Group II and Group III of the Periodic Table and (b) an anionic element selected from the group consisting of Group V and Group VI of the Periodic Table, said elements being present in stoichiometric amounts, the improvement which comprises the steps of: incorporating into an ampoule maintained substantially under vacuum stoichiometric amounts of (a) said cationic element and (b) said anionic element; heating the contents in said ampoule to a temperature sufficiently high to both vaporize said anionic element and to melt, but not to vaporize, the said cationic element; maintaining said initial temperature whereby intermetallic compound forms, solidifies and blankets the said molten cationic element; locally applying sufficient heat to a portion of said ampoule to insure the vaporization, but not the decomposition, of the formed intermetallic compound surrounding said molten cationic element; crystallizing the latter vaporized intermetallic compound from the surface of the molten cationic element in a non-locally heated portion of said ampoule; and continuing to heat the ampoule locally at the latter temperature until the molten cationic element therein has been totally consumed.

2. A process according to claim 1, wherein the Group II element reactant is cadmium and the Group V element reactant is phosphorus.

3. A process according to claim 1, wherein the Group II element reactant is cadmium and the Group V element reactant is arsenic.

4. A process according to claim 2, wherein the ampoule is initially heated to a constant temperature of 500° C. and the local heating temperature is maintained at a temperature of about 700° C.

References Cited by the Examiner

UNITED STATES PATENTS

| | | | |
|---|---|---|---|
| 2,871,100 | 1/1959 | Guire et al. | 23—204 |
| 3,230,044 | 1/1966 | Hegyi | 23—204 |

OSCAR R. VERTIZ, *Primary Examiner.*

H. S. MILLER, *Assistant Examiner.*